(12) United States Patent
Kim et al.

(10) Patent No.: US 8,344,540 B2
(45) Date of Patent: Jan. 1, 2013

(54) WIND AND WATER POWER GENERATOR SHIP

(75) Inventors: Yeong-Saeng Kim, Gimhae-si (KR);
Dae-Hee Lee, Gimhae-si (KR)

(73) Assignee: INJE Univ. Industry-Academic Cooperation Foundation (KR)

( * ) Notice: Subject to any disclaimer, the term of this patent is extended or adjusted under 35 U.S.C. 154(b) by 0 days.

(21) Appl. No.: 13/286,492

(22) Filed: Nov. 1, 2011

(65) Prior Publication Data

US 2012/0043764 A1    Feb. 23, 2012

Related U.S. Application Data

(63) Continuation of application No. PCT/KR2010/005295, filed on Aug. 12, 2010.

(30) Foreign Application Priority Data

Jul. 28, 2010  (KR) ........................ 10-2010-0061144

(51) Int. Cl.
*H02P 9/04* (2006.01)
(52) U.S. Cl. ............................................ 290/55; 290/53
(58) Field of Classification Search .................. 290/4 A,
290/4 D, 42, 43, 44, 53, 54, 55; 416/7, 101.86,
416/85, 8; 415/7, 3.1, 4.1, 2.1, 4.3, 210.1;
104/24; 406/191, 192, 194, 195
See application file for complete search history.

(56) References Cited

U.S. PATENT DOCUMENTS

| 4,346,305 A * | 8/1982 | White ............................. 290/55 |
| 8,206,106 B2 * | 6/2012 | Syrovy ............................ 416/83 |

* cited by examiner

*Primary Examiner* — Tulsidas C Patel
*Assistant Examiner* — Viet Nguyen
(74) *Attorney, Agent, or Firm* — Park & Associates IP Law, P.C.

(57) ABSTRACT

A wind and water power generator ship. A waterpower generation unit generates electricity using a difference between the ebb and the flow of the tides, and is provided with a buoyant body that produces buoyancy, which enables the waterpower generation unit to float on water. A center shaft is mounted on a base on an upper end of the waterpower generation unit, and is rotatably supported by a bearing. A wind power generation unit generates electricity using wind power, is provided on an upper end of the center shaft, and is rotatable depending on a direction of wind. The distance from a front end of the wind power generation unit to the center shaft is shorter than the distance from the center shaft to a rear end of the wind power generation unit.

6 Claims, 2 Drawing Sheets

(a)   (b)

WIND AND WATER POWER GENERATOR SHIP

REFERENCE TO RELATED APPLICATIONS

This is a continuation of pending International Patent Application PCT/KR2010/005295 filed on Aug. 12, 2010, which designates the United States and claims priority of Korean Patent Application No. 10-2010-0061144 filed on Jun. 28, 2010, the entire contents of which are incorporated herein by reference.

FIELD OF THE INVENTION

The present invention relates, in general, to a wind and water power generator ship and, more particularly, to a wind and water power generator ship that cruises by supplying self-generated electric power using wind and water power.

BACKGROUND OF THE INVENTION

In general, methods of generating electricity using the power of nature include waterpower generation, wind power generation, thermal power generation, etc.

Among these, a number of waterpower generation apparatuses, which generate electricity using the velocity of running water in a sea area where the velocity of the water is fast because of the difference between the ebb and the flow in the tides, a river, or the like, are being proposed.

Korean Patent Application Publication No. 10-2008-0054321 (entitled "Apparatus Structure Using Slow Waterpower") discloses an apparatus that uses waterpower. The apparatus includes a pair of conveyor belts, a conveyor roller on which a plurality of resistance plates in the form of a hinge which pivots at 90° is mounted, a chain rope connected to the conveyor roller, a coupling connected to a gear box and a generator connected to the coupling.

In addition, Korean Patent Application Publication No. 2001-78479 (titled "Generator 70 Using Ocean Current") discloses a generator, which includes a load rail on which a plurality of power boards is mounted, a gear box connected to a roller and a generator connected to the gear box.

Although the inventions of the related art generate electricity using the resistance between an object, which is set afloat on running water, and the current of the water, the efficiency of generation is low because of the slow velocity of the water.

When the resistance plate or board meets resistance from the current of water from the front, it is rotated by 90° or more due to dislodgment, tilting, or slimming, which is caused by the velocity of the water, and thus loses power. If the resistance plate is not tightly fixed, there is a danger of the resistance plate being damaged by the fast velocity of the water.

In addition, in the related art, a plurality of wind power generation apparatuses, which generates electricity using wind, has been proposed.

However, the wind power generation apparatuses of the related art have problems in that the efficiency of power generation is low because of a small turning moment and additional power for operation being required in a weak wind since the blades consume a large amount of force.

SUMMARY OF THE INVENTION

Accordingly, the present invention has been made keeping in mind the above problems occurring in the related art, and is intended to provide a wind and water power generator ship, which is set afloat on running water so that the powers of both water and wind can be used, thereby increasing the efficiency of power generation.

Another purpose of the present invention is to provide a wind and water power generator ship which minimizes the loss in power because the plates warp less and have less slimming even at the resistance of running water or in the strong wind.

Furthermore, the present invention is also intended to provide a wind and water power generator ship that can operate under its own self-generated power by supplying electric power from running water and changing its direction depending on the direction of the wind.

In an aspect, the present invention provides a wind and water power generator ship, including: a waterpower generation unit, which generates electricity using a difference between the ebb and the flow of the tides, the waterpower generation unit having a buoyant body that produces buoyancy, which enables the waterpower generation unit to float on water; a center shaft mounted on a base, which is provided on an upper end of the waterpower generation unit, the center shaft being rotatably supported by a bearing; and a wind power generation unit, which generates electricity using wind power, the wind power generation unit being provided on an upper end of the center shaft, and is rotatable depending on the direction of the wind. The distance from a front end of the wind power generation unit to the center shaft is shorter than a distance from the center shaft to a rear end of the wind power generation unit.

It is preferable that the water power generation unit include a support body, which defines an outer shape of the waterpower generation unit; a pair of drive rollers, which are disposed on opposite ends of the support body; a pair of conveyor ropes, which are wound on the drive rollers and are disposed parallel to each other such that they are rotatably supported; a plurality of plates, which are hinge-coupled to the conveyor ropes, and are spaced apart from each other at regular intervals; a plurality of connecting wires, which are disposed between the plates to connect the plates to the conveyor rope; and a power transmission belt, which connects the drive rollers to a generator, which is disposed on the support body.

It is preferable that the water power generation unit include a support body, which defines an outer shape of the wind power generation unit; a pair of drive rollers, which are disposed on opposite ends of the support body; a pair of conveyor ropes, which are wound on the drive rollers and are disposed parallel to each other such that they are rotatably supported; a plurality of plates, which are hinge-coupled to the conveyor ropes, and are spaced apart from each other at regular intervals; a plurality of connecting wires, which are disposed between the plates to connect the plates to the conveyor rope; and a power transmission belt, which connects the drive rollers to a generator, which is disposed on the support body.

It is preferable that the center shaft be positioned at a point that is ⅓ of a length of the wind power generation unit.

It is preferable that the plates have a through-hole in a central portion thereof, such that wind that has passed through the through-hole in a frontward plate is delivered to a rearward plate.

In addition, it is preferable that the wind power generation unit further include a wind collector, which collects wind in one place.

According to the present invention as described above, the following effects can be anticipated.

First, the efficiency of power generation is high, since energy is produced using both waterpower and wind power.

In addition, there is an effect in that a loss in power is avoided by preventing the plates from being dislodged or warped even at a large amount of resistance, which is caused by water moving at fast velocity, by strong wind, or the like.

Furthermore, the present invention is available for a ship that generates its own electricity since the ship changes its direction on running water and supplies self-generated electric power.

Moreover, the ship can be placed anywhere on running water, can be constructed in a short time, and does not occupy a large area, thereby reducing the cost of construction.

MAJOR REFERENCE NUMERALS OF THE DRAWINGS

Figure 1:
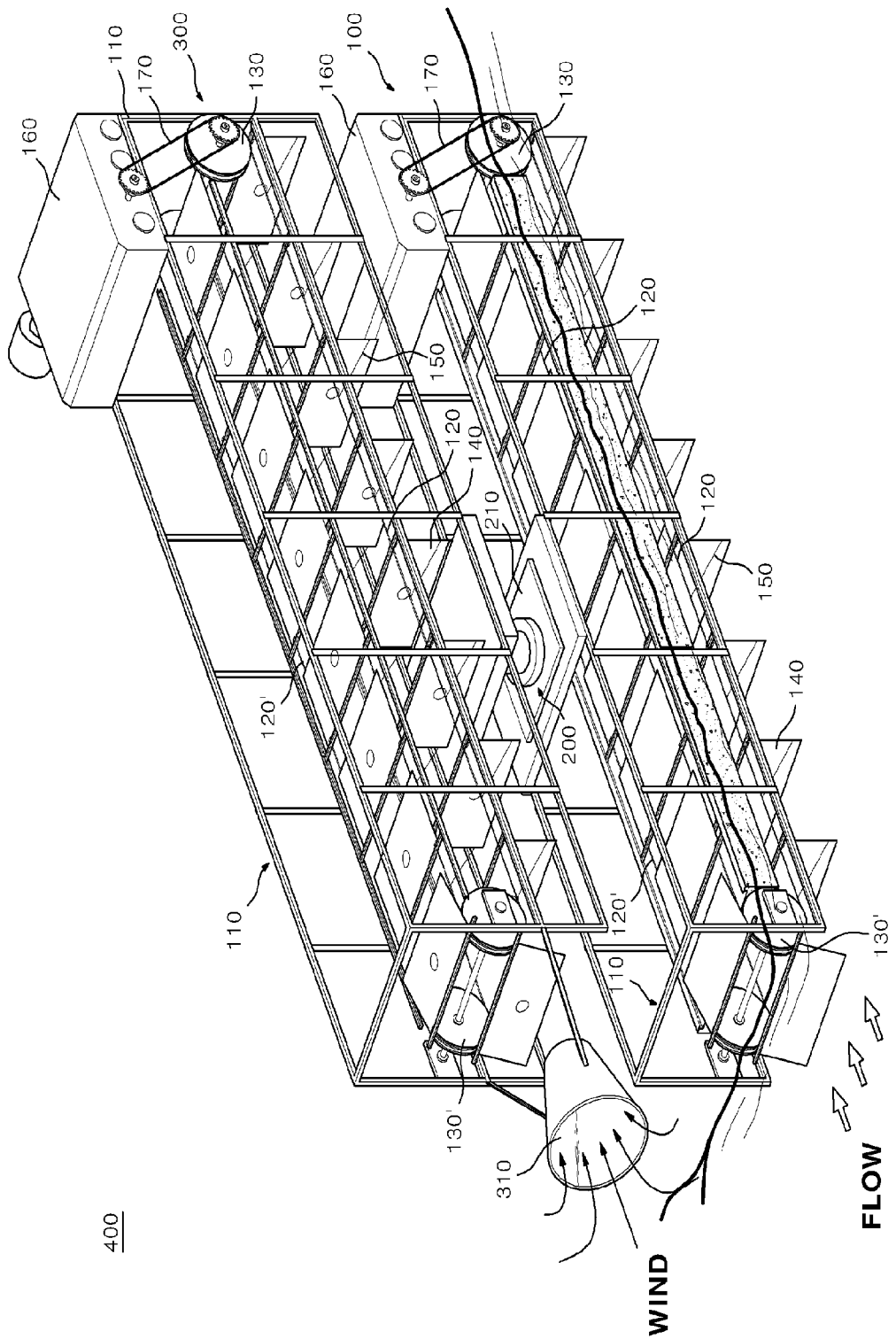
FIG. 1 is a perspective view showing a wind and water power generator ship according to a preferred embodiment of the present invention.

100: waterpower generation unit
110: support body
120, 120': conveyor rope
130: drive roller
140, 140': plate
150, 150': connecting wire
160: generator
170: power transmission belt
200: center shaft
210: base
300: wind power generation unit
310: wind collector
400: wind and water power generator ship

DETAILED DESCRIPTION OF THE INVENTION

Hereinafter a wind and water power generator ship of the present invention will be described in detail with reference to the accompanying drawings.

FIG. 1 is a perspective view showing a wind and water power generator ship according to a preferred embodiment of the present invention.

As shown in the figure, the present invention 400 generally includes a waterpower generation unit 100, a center shaft 200 and a wind power generation unit 300.

A description will be given first of the waterpower generation unit 100.

The waterpower generation unit 100 generates electricity using the difference between the ebb and the flow of the tides, and is provided with a buoyant body (not shown) that produces buoyancy, which enables the waterpower generation unit 100 to float on water.

In more detail, the waterpower generation unit 100 includes a support body 110, which defines the outer shape of the waterpower generation unit 100; a pair of drive rollers 130 and 130', which are disposed on opposite ends of the support body 110; a pair of conveyor ropes 120 and 120', which are wound on the drive rollers 130 and 130' and are disposed parallel to each other such that they are rotatably supported; a plurality of plates 140, which are hinge-coupled to the conveyor ropes 120 and 120', and are spaced apart from each other at regular intervals; a plurality of connecting wires 150, which are disposed between the plates 140 to connect the plates 140 to the conveyor rope 120; a generator 160, which is disposed on the support body 110; and a power transmission belt 170, which connects the drive rollers 130 to the generator 160.

The support body 110 may be referred to as a frame that defines the entire outer shape.

In addition, the conveyor ropes 120 are disposed in the lengthwise direction of the support body 110, i.e. in the direction of running water, and are rotatably wound and supported on the pair of drive rollers 130 and 130', which are disposed on the opposite ends of the support body 110.

The plurality of plates 140 are bound to the conveyor rope 120 at regular intervals, via hinge coupling.

In particular, the connecting wires 150 connect the conveyor rope 120 and the plates 140, and serve to prevent the plates 140 from turning by 90° or more.

Each of the connecting wires 150 is connected to a corresponding one of the plates 140, and preferably, to the lower portion of the plate 140 in order to prevent the plate 140 from being warped or dislodged.

Specifically, both sides of the lower portion of the plate 140 are connected to and supported on the conveyor rope 120 via connecting wires 150. Consequently, the plate 140 is prevented from being warped in one direction or dislodged.

It is preferred that the connecting wires 150 be made of a rigid material, such as a steel wire, which is not easily torn or worn.

In addition, the power transmission belt 170 is a belt, which transmits force that is produced by the conveyor rope 120 to the generator 160, so that rotational force is converted into electric energy.

The center shaft 200 will now be described.

The center shaft 200 is mounted on a base 210, which is disposed on the upper end of the waterpower generation unit 100. The center shaft 200 is rotatably supported on a bearing (not shown).

The bearing (not shown) is contained in the base 210 such that the center shaft 200 rolls on the bearing. Consequently, the center shaft 200 can easily rotate with less friction.

A wind power generation unit, which will be described later, is disposed on the upper end of the center shaft such that it rotates depending on the direction of the wind.

The wind power generation unit 300 will now be described.

The wind power generation unit 300 generates electricity from wind, and is fixed to the upper end of the center shaft 200 such that it can rotate depending on the direction of the wind.

In more detail, the wind power generation unit 300 includes a support body 110, which defines the outer shape of the wind power generation unit 300; a pair of drive rollers 130 and 130', which are disposed on opposite ends of the support body 110; a pair of conveyor ropes 120 and 120', which are wound on the drive rollers 130 and 130' and are disposed parallel to each other such that they are rotatably supported; a plurality of plates 140, which are hinge-coupled to the conveyor ropes 120 and 120', and are spaced apart from each other at regular intervals; a plurality of connecting wires 150, which are disposed between the plates 140 to connect the plates 140 to the conveyor rope 120; a generator 160, which is disposed on the support body 110; and a power transmission belt 170, which connects the drive rollers 130 to the generator 160.

When the wind blows from the front, the plates 140 rotate the conveyor ropes 120 due to its resistance against the wind.

Since both sides of each plate 140 are connected to the conveyor ropes 120 via corresponding connecting wires 150, the plate 140 is not subjected to warping or distortion at an angle of 90° or more.

Here, descriptions of the support body 110, the conveyor ropes 120, the plates 140, the generator 1460 and the power transmission belt 170 will be omitted, since they are identical to those of the waterpower generation unit 100, which were described above.

In addition, a wind collector 310 is disposed in the front portion of the wind power generation unit 300 such that the wind can be collected in one place.

Each of the plates 140 of the wind power generation unit 300 has a through-hole (shown in FIG. 1) in the central portion thereof such that the wind that has passed through frontward plates 140 can easily be delivered to rearward plates 140, thereby increasing the efficiency of power generation.

Figure 2:
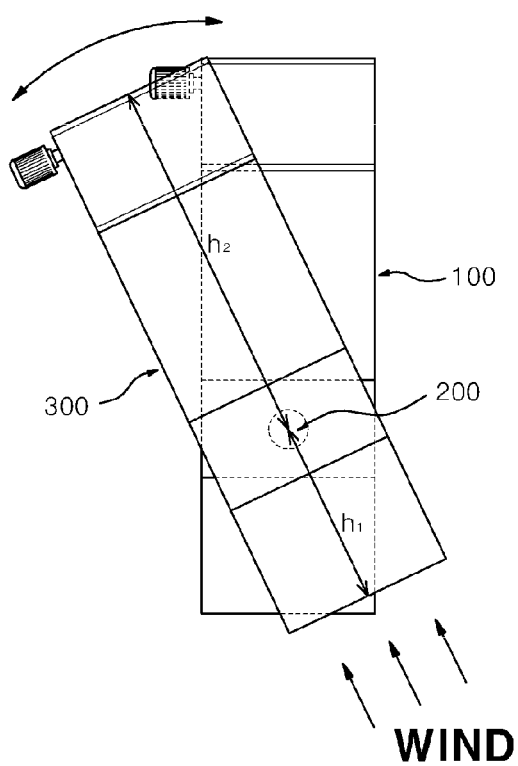
FIG. 2(a) and FIG. 2(b) are views illustrating the wind power generator, the rotation of which depends on the direction of the wind, according to a preferred embodiment of the present invention.
Figure 2:
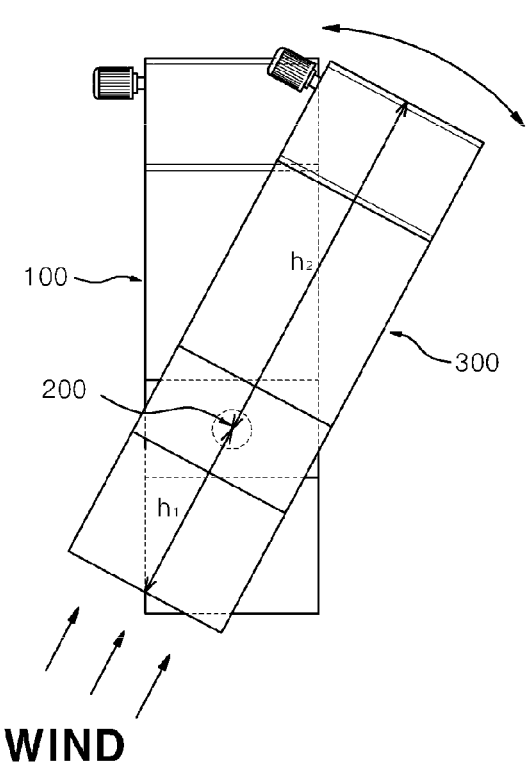

Next, FIG. 2(a) and FIG. 2(b) are top plan views showing the wind power generation unit, which rotates following the wind.

As shown in the drawings, the center shaft is positioned such that the distance from the front end of the wind power generation unit 300 to the center shaft 200 is shorter than the distance from the center shaft 200 to the rear end of the wind power generation unit 300. Preferably, the center shaft is positioned at a point that is approximately ⅓ of the length of the wind power generation unit.

That is, the length h2 is set to be longer than the length h1 such that more plates are attached in the length h2.

Consequently, the length h2 is exposed to more wind and is thus further moved toward the opposite side.

Accordingly, when the wind blows from the right, as shown in FIG. 2(a), the rear end of the wind power generation unit is more displaced to the left than the front end of the wind power generation unit is, so that the bow is relatively directed to the right.

In addition, when the wind blows from the left, as shown in FIG. 2(b), the rear end of the wind power generation unit 300 is displaced more to the right than the front end of the wind power generation unit is, so that the bow is relatively directed to the left.

As above, the wind and water power generator ship of the present invention can change its direction depending on the direction of the wind.

A description will be given below of an application of the present invention.

The wind and water power generator ship 400 of the present invention is set afloat on running water.

Running water pushes the plates 140 attached to the conveyor ropes 120 of the waterpower generation unit 100, thereby rotating the conveyor ropes 120.

The rotational force transmits power to the generator 160, to which the conveyor ropes 120 are connected, and the generator 160 converts the energy of the flowing water into electrical energy.

Here, since the plates 140 are supported by the connecting wires 150, they stay in the vertical position without being folded back even when they are subjected to the resistance of water.

The wind in the air is collected in one place by the wind collector 310, so that it rotates the conveyor ropes 120 while pushing the plates 140 attached to the conveyor ropes 120 of the wind power generation unit 30.

This rotational force is transmitted to the generator 160, so that the energy of the wind is converted into electrical energy.

As described above, the wind and water power generator ship 400 can operate by itself by supplying electric power by itself from running water and changing its direction depending on the direction of the wind.

It should be understood that the basic technical principle of the present invention as set forth above is to provide the wind and water power generator ship, which is set afloat on running water in order to use both waterpower and wind power, thereby increasing the efficiency of power generation. It is also apparent to a person having ordinary skill in the art that a variety of changes and modifications is possible without departing from the scope of the principle of the present invention.

What is claimed is:

1. A wind and water power generator ship comprising:
   a waterpower generation unit, which generates electricity using a difference between an ebb and a flow of a tide, wherein the waterpower generation unit has a buoyant body that produces buoyancy, which enables the waterpower generation unit to float on water;
   a center shaft mounted on a base, which is provided on an upper end of the waterpower generation unit, the center shaft being rotatably supported by a bearing; and
   a wind power generation unit, which generates electricity using wind power, wherein the wind power generation unit is provided on an upper end of the center shaft, and is rotatable depending on a direction of wind, wherein a distance from a front end of the wind power generation unit to the center shaft is shorter than a distance from the center shaft to a rear end of the wind power generation unit.

2. The wind and water power generator ship of claim 1, wherein the water power generation unit comprises:
   a support body, which defines an outer shape of the waterpower generation unit;
   a pair of drive rollers, which are disposed on opposite ends of the support body;
   a pair of conveyor ropes, which are wound on the drive rollers and are disposed parallel to each other such that they are rotatably supported;
   a plurality of plates, which are hinge-coupled to the conveyor ropes, and are spaced apart from each other at regular intervals;
   a plurality of connecting wires, which are disposed between the plates to connect the plates to the conveyor rope; and
   a power transmission belt, which connects the drive rollers to a generator, which is disposed on the support body.

3. The wind and water power generator ship of claim 1, wherein the wind power generation unit comprises:
   a support body, which defines an outer shape of the wind power generation unit;
   a pair of drive rollers, which are disposed on opposite ends of the support body;
   a pair of conveyor ropes, which are wound on the drive rollers and are disposed parallel to each other such that they are rotatably supported;
   a plurality of plates, which are hinge-coupled to the conveyor ropes, and are spaced apart from each other at regular intervals;
   a plurality of connecting wires, which are disposed between the plates to connect the plates to the conveyor rope; and
   a power transmission belt, which connects the drive rollers to a generator, which is disposed on the support body.

4. The wind and water power generator ship of claim 1, wherein the center shaft is positioned at a point that is ⅓ of a length of the wind power generation unit.

5. The wind and water power generator ship of claim 3, wherein each of the plates of the wind power generation unit have a through-hole in a central portion thereof, such that wind that has passed through the through-holes in frontward plates is easily delivered to rearward plates thereof.

6. The wind and water power generator ship of claim 3, wherein the wind power generation unit further comprises a wind collector, which collects wind in one place.

\* \* \* \* \*